(12) United States Patent
Pasupuleti

(10) Patent No.: US 11,416,489 B2
(45) Date of Patent: Aug. 16, 2022

(54) EARLY GROUPING OPTIMIZATION FOR SQL STATEMENTS BY NORMALIZING ARITHMETIC EXPRESSIONS IN AGGREGATES

(71) Applicant: ORACLE INTERNATIONAL CORPORATION, Redwood Shores, CA (US)

(72) Inventor: Krishna Kantikiran Pasupuleti, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/105,255

(22) Filed: Nov. 25, 2020

(65) Prior Publication Data

US 2022/0164353 A1    May 26, 2022

(51) Int. Cl.
*G06F 16/245* (2019.01)
*G06F 16/2453* (2019.01)
*G06F 7/544* (2006.01)

(52) U.S. Cl.
CPC ........ *G06F 16/24544* (2019.01); *G06F 7/544* (2013.01)

(58) Field of Classification Search
None
See application file for complete search history.

(56) References Cited

U.S. PATENT DOCUMENTS

| | | | |
|---|---|---|---|
| 5,598,559 A * | 1/1997 | Chaudhuri | G06F 16/24537 |
| 5,897,632 A * | 4/1999 | Dar | G06F 16/24556 |
| 6,535,872 B1 | 3/2003 | Castelli et al. | |
| 7,379,933 B1 | 5/2008 | Witkowski et al. | |
| 10,740,333 B1 * | 8/2020 | Betawadkar-Norwood | G06F 16/24556 |
| 11,099,902 B1 | 8/2021 | Matthews et al. | |
| 2008/0306903 A1 | 12/2008 | Larson et al. | |

(Continued)

OTHER PUBLICATIONS

Fender et al., U.S. Appl. No. 16/797,507, filed Feb. 21, 2020, Non-Final Rejection, dated Oct. 18, 2021.

(Continued)

*Primary Examiner* — Son T Hoang
(74) *Attorney, Agent, or Firm* — Hickman Becker Bingham Ledesma LLP

(57) ABSTRACT

According to embodiments, a database server instance may generate group-by placement (GBP) states that define potential GBP transformations for a query in which some aggregate tables are included in the GBP view and other aggregate tables are not. Such states are referred to herein as relaxed-C states. To rewrite a query based on a selected relaxed-C GBP state such that the rewritten query is semantically equivalent to the original query, any arithmetic expression within an aggregate expression of the query is normalized into terms, and the query rewrite is implemented on a term-specific basis. Specifically, aggregate function-specific query modification rules are applied to each term of the normalized arithmetic expression. The applied query modification rules dictate what is included in the GBP view and what is included in the outer portion of the rewritten query to ensure that the rewritten query is semantically equivalent to the original query.

20 Claims, 5 Drawing Sheets

(56) References Cited

U.S. PATENT DOCUMENTS

| | | | |
|---|---|---|---|
| 2009/0055349 | A1 | 2/2009 | Ahmed |
| 2009/0055350 | A1* | 2/2009 | Branish, II ........ G06F 16/24537 |
| 2015/0293968 | A1 | 10/2015 | Dickie |
| 2016/0378827 | A1 | 12/2016 | Bondalapati et al. |
| 2017/0329823 | A1 | 11/2017 | Attaluri et al. |
| 2018/0018375 | A1* | 1/2018 | Brunel ................ G06F 16/9024 |
| 2018/0018383 | A1* | 1/2018 | Brunel .................. G06F 16/282 |
| 2020/0372029 | A1 | 11/2020 | Betawadkar-Norwood et al. |
| 2020/0401581 | A1* | 12/2020 | Eubank ............... G06F 16/2456 |
| 2021/0263930 | A1* | 8/2021 | Fender ............. G06F 16/24542 |
| 2022/0164340 | A1 | 5/2022 | Pasupuleti |

OTHER PUBLICATIONS

Weipeng P. Yan and Per-Ake Larson. "Eager Aggregation and Lazy Aggregation", VLDB 1995, 13 pages.

S. Chaudhuri and K. Shim. "Including group-by in query optimization", VLDB dated 1994, 13 pages.

M. Eich, P. Fender and G. Moerkotte. "Faster Plan Generation through Consideration of Functional Dependencies and Keys", PVLDB, vol. 9, dated 2016, 12 pages.

M. Eich, G. Moerkotte. "Dynamic programming: The next step.", ICDE dated dated Oct. 2014, 45 pages.

G. Lohman. "Is query optimization a solved problem?" http://wp.sigmod.org/?p=1075, dated 2014, 6 pages.

A. Gupta, V. Harinarayan and D. Quass. "Aggregate-Query Processing in Data Warehousing Environments", VLDB dated1995, 12 pages.

Fender, U.S. Appl. No. 16/797,507, filed Feb. 21, 2020, Final Rejection, dated May 4, 2022.

Pasupuleti, U.S. Appl. No. 17/105,268, filed Nov. 25, 2020, Non-Final Rejection, dated May 12, 2022.

\* cited by examiner

202 IDENTIFY ONE OR MORE VALID STATES FOR A PARTICULAR QUERY, WHERE EACH VALID STATE, OF THE ONE OR MORE VALID STATES, IDENTIFIES: A COALESCE SET OF DATABASE OBJECTS THAT COMPRISES AT LEAST ONE AGGREGATE DATABASE OBJECT OF THE TWO OR MORE AGGREGATE DATABASE OBJECTS, AND A FACTOR SET OF DATABASE OBJECTS THAT COMPRISES ONE OR MORE DATABASE OBJECTS, OF THE PLURALITY OF DATABASE OBJECTS, OTHER THAN THE COALESCE SET OF DATABASE OBJECTS IDENTIFIED BY SAID EACH VALID STATE

204 SELECT A PARTICULAR VALID STATE, OF THE ONE OR MORE VALID STATES, THAT COMPRISES: A PARTICULAR COALESCE SET OF DATABASE OBJECTS THAT INCLUDES LESS THAN ALL OF THE TWO OR MORE AGGREGATE DATABASE OBJECTS, AND A PARTICULAR FACTOR SET OF DATABASE OBJECTS

206 GENERATE A REWRITTEN QUERY THAT APPLIES EARLY GROUPING, BEFORE APPLYING A PARTICULAR JOIN EXPRESSION OF THE PARTICULAR QUERY, FOR AT LEAST ONE OF: THE PARTICULAR COALESCE SET OF DATABASE OBJECTS, AND THE PARTICULAR FACTOR SET OF DATABASE OBJECTS

| [T1 T2 T3] 402 | {C} 404 | {F} 406 | Disposition of AT 408 | Connected 410 | Sub-States 412 |
|---|---|---|---|---|---|
| [1 1 1] | {T1, T2, T3} | ∅ | C ⊇ AT | C | none |
| [1 1 0] | {T1, T2} | {T3} | C ⊇ AT | C, F | SCG, SFG, CCFG |
| [0 1 1] | {T2, T3} | {T1} | C !⊇ AT | C, F | SCG |
| [0 1 0] | {T2} | {T1, T3} | C ⊂ AT | C | SCG |
| [1 0 1] | {T1, T3} | {T2} | C !⊇ AT | F | none |
| [1 0 0] | {T1} | {T2, T3} | C ⊂ AT | C, F | SCG |
| [0 0 1] | {T3} | {T1, T2} | C !⊇ AT | C, F | none |

EARLY GROUPING OPTIMIZATION FOR SQL STATEMENTS BY NORMALIZING ARITHMETIC EXPRESSIONS IN AGGREGATES

RELATED APPLICATIONS

This application is related to U.S. application Ser. No. 16/797,507, titled "Partial Group By For Eager Group By Placement Query Plans", filed Feb. 21, 2020, and also to U.S. application Ser. No. 17/105,268, titled "Early Grouping Optimization For SQL Statements With Conditional Expressions", filed Nov. 25, 2020, the entire contents of each of which are incorporated by reference as if fully set forth herein.

FIELD OF THE INVENTION

The present invention relates to rewriting SQL statements using early grouping transformations, and, more specifically, to enabling wider application of early grouping transformation by normalizing arithmetic expressions inside aggregate expressions of SQL statements.

BACKGROUND

Joins are very useful relational database operations, but can also be very costly. Thus, it is beneficial to optimize join queries, e.g., using query transformations. Group-by placement (GBP) refers to an array of early grouping query transformation strategies that involve pre-aggregating intermediate results by an eager group-by operation in order to reduce the input cardinality to one or more subsequent operations, such as a join operation. A final group-by operation, after the join operation, computes the final aggregate values. Early group-by evaluation may result in a significant reduction of the number of rows on which one or more group-by operators apply, as well as a reduction in the number of rows later used in the join. Hence the overall performance of the query may improve significantly.

Nevertheless, early group-by operations incur additional costs and do not always substantially reduce the input cardinality to subsequent operations. Thus, database management systems generally employ a cost-based query transformation framework to determine the cost of a given query if various query transformations were to be used to transform the query. Using the determined costs, the framework identifies which query transformation(s), if any, should be applied to a query. In the case of GBP transformations, for a given query, the framework generates one or more group-by states that represent different group-by operations that may be used as a transformation for the query. The framework determines the cost of running the query using the various possible query states in order to evaluate whether the group-by operations represented by the states should be employed to transform the query.

Certain constructs in queries can prevent a GBP transformation from being applied to the queries. For example, a complex arithmetic expression involving columns from multiple tables can prevent GBP transformation from taking place. Also, a GBP transformation is generally not applicable to a query where all database objects in the query are also referred to in an aggregate function expression of the query. Furthermore, in many cases, the potential states of GBP transformation that are considered for rewriting a query are limited, even in situations where GBP is applicable.

Thus, it would be beneficial to allow GBP transformations to be applied to a wider range of queries (e.g., for queries with complex arithmetic expressions), and to increase the number of potential states of GBP transformation that are considered for rewriting queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 depicts a flowchart for using GBP transformation to rewrite a query that comprises a plurality of query database objects.

DETAILED DESCRIPTION

Figure 1:
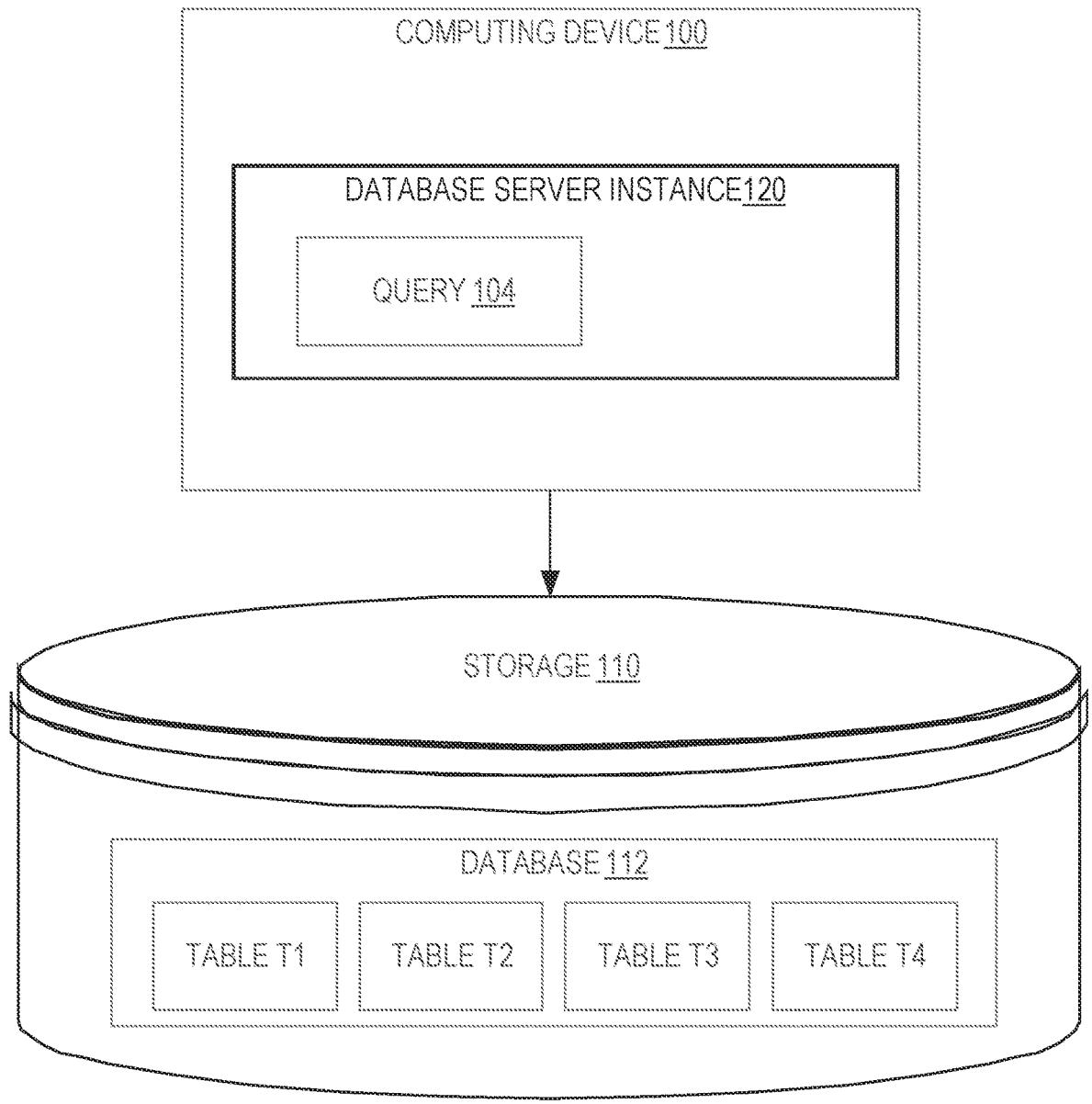
FIG. 1 depicts a block diagram of an example computing device running a database server instance of a database management system.

In the following description, for the purposes of explanation, numerous specific details are set forth in order to provide a thorough understanding of the techniques described herein. It will be apparent, however, that the techniques described herein may be practiced without these specific details. In other instances, well-known structures and devices are shown in block diagram form in order to avoid unnecessarily obscuring these techniques.

General Overview

In order to effect early grouping for a given query using a GBP transformation, grouping for some of the database objects referred to in the query is performed in a view that is introduced into the query during a rewrite stage of query execution. Prior to techniques described herein, all database objects referred to in aggregate expressions within a query (which database objects are referred to herein as "aggregate tables" or "AT") were considered as an indivisible group when costing potential GBP transformation-type query rewrites. However, this rule restricted the possible implementations of GBP transformation available for costing to configurations that treat similarly all database objects found within aggregate expressions of the query (i.e., all AT are found within a GBP view or are found entirely outside of a GBP view).

To increase the applicability of GBP transformations, according to embodiments described herein, GBP states that define potential GBP transformations for a given query are able to treat the AT of a query differently, instead of as an indivisible group. Specifically, the database server instance may generate GBP states for a query in which some tables in AT are included in the GBP view and other tables in AT are not. Such states are referred to herein as relaxed-C states.

In order to rewrite a query based on a selected relaxed-C GBP state such that the rewritten query is semantically equivalent to the original query, any arithmetic expression within an aggregate expression of the query is normalized into terms, and the query rewrite is implemented on a term-specific basis. Specifically, aggregate function-specific query modification rules are applied to each term of the normalized arithmetic expression. The applied query modification rules dictate what is included in the GBP view and what is included in the outer portion of the rewritten query to ensure that the rewritten query is semantically equivalent to the original query.

The ability to evaluate relaxed-C states, as well as the other GBP states that were previously considered to be valid, for rewriting a query using GBP transformation allows application of GBP transformation to a wider variety of queries and also increases the possible GBP states that can be costed for GBP transformation-eligible queries. Thus, a DBMS that implements query rewrite may apply GBP transformations more widely to increase the efficiency of running queries that involve aggregate functions and joins, which are notoriously expensive. Such application of GBP transformation can result in significant speed improvements to client workloads where the transformed workloads may run at speeds that are orders of magnitude faster than is achieved without the GBP transformation, e.g., for workloads involving joins over very large tables.

Examples of GBP Transformations

Applying GBP transformation to a query involves rewriting the query into another semantically equivalent query that produces the same result and that can potentially be executed more efficiently, i.e., one for which a potentially more efficient and cheaper execution plan can be generated. The basic types of GBP transformations involve applying early grouping on the aggregating table(s) and/or on non-aggregating tables(s) of a query. The aggregating tables (AT) of a query are the set of tables that are referred to in aggregate expressions of the query. Example aggregate functions include COUNT( ), AVG( ), SUM( ), MIN( ), and MAX( ). When the tables referred to in an aggregate expression of a query are not connected by join expressions within the query, the AT includes a minimal set of tables needed to make the AT a connected set. The non-aggregating tables (NAT) of a query are the set of tables that do not appear in AT.

Examples of GBP transformation described herein are described in the context of an example computing device 100 depicted in FIG. 1. Computing device 100 runs a database server instance 120 of a database management system (DBMS). According to an embodiment, computing device 100 receives, from a user, a query 104 over data in database 112 stored at persistent storage 110 and managed by database server instance 120. According to an embodiment, database 112 stores data that may be formatted as graph data, relational data, Resource Description Framework (RDF) data, etc. Examples of GBP transformations herein refer to database tables (e.g., tables T1-T4 in database 112 of FIG. 1), but are not limited thereto, and may be applicable to any kind of database object.

Before GBP transformation is implemented for a given query, such as query 104, database server instance 120 determines whether the query is eligible for GBP transformation. Prior to techniques described herein, the disposition of tables within the aggregate expression of a query is used to determine whether a query is eligible for GBP transformation. More specifically, a query that includes all query tables in AT (i.e., the query includes all referred-to tables in an aggregate expression) would not be eligible for GBP transformation. This is because, prior to expression normalizing techniques described herein, all tables of AT were required to be either in or outside of the GBP view, and grouping was done on the result of the join of all the tables inside the set.

For example, the following query Q1 refers to query tables T1 and T2, and only a strict subset of these tables is in AT (i.e., only table T1 is referred to in the aggregate expression of the query). Accordingly, Q1 has one AT (T1) and one NAT (T2).

| Q1 | SELECT SUM(T1.a) |
| --- | --- |
| | FROM T1, T2 |
| | WHERE T1.x = T2.x and T2.k > 4 |
| | GROUP BY T1.g; |

Because not all tables in query Q1 are in AT, the disposition of tables within query Q1 would not prevent the query from being evaluated for GBP transformation.

There are three different configurations of GBP transformations: single-coalesced grouping (SCG), single-factored grouping (SFG), and combined coalesced factored grouping (CCFG), each of which are described in further detail below.

Single-Coalesced Grouping

Query Q1A (shown below) is obtained by transforming query Q1 according to an SCG-type GBP transformation, which applies early grouping on the AT in the query. Specifically, the transformation causes table T1 to be grouped before the join with table T2.

| Q1A | SELECT SUM(V.Sa) |
| --- | --- |
| | FROM T2, (SELECT T1.x, T1.g, SUM(T1.a) Sa |
| | FROM T1 |
| | GROUP BY T1.x, T1.g) V |
| | WHERE V.x = T2.x and T2.k > 4 |
| | GROUP BY V.g; |

Prior to techniques described herein, an SCG view used to implement an SCG-type GBP transformation was required to include all tables in AT, which guarantees that the rewritten query is semantically equivalent to the original query. As indicated above, because query Q1 includes only one table in AT, all of AT is included in the SCG view included in rewritten query Q1A.

However, prior to techniques described herein, the following query Q2 was not eligible for GBP transformation because both table T1 and table T2 appear in the aggregate expressions of the query and, as such, are included in AT.

| Q2 | SELECT SUM(T1.a), SUM(T2.b) |
| --- | --- |
| | FROM T1, T2 |
| | WHERE T1.x = T2.x and T2.k > 4 |
| | GROUP BY T1.x; |

All query tables in Q2 are not able to be included in a GBP view because no tables would remain outside of the view with which to perform the required join operation. However, execution of query Q2 would benefit from early grouping in various cases, such as when table T2 is a large table or is loaded in memory and could benefit from piggybacking grouping on in-memory scans, etc. To illustrate, the following query Q2A is a rewrite of Q2 using an SCG-type GBP transformation with table T2 included in the SCG view and table T1 excluded from the SCG view:

```
Q2A    SELECT SUM(T1.a*V.CNT), SUM(V.Sb)
       FROM T1,   (SELECT T2.x, SUM(T2.b) Sb, COUNT(*) CNT
                   FROM T2
                   WHERE T2.k > 4
                   GROUP BY T2.x) V
       WHERE T1.x = V.x
       GROUP BY T1.x;
```

The query rewrite performs changes in both the outer query block (i.e., in the aggregate expression, multiplying T1.a by V.CNT, and replacing T2.b with V.Sb), which correspond to portions in the GBP view (i.e., COUNT(*) CNT is included in the view to allow multiplying T1.a by V.CNT, and SUM(T2.b) Sb is included in the view to allow performing SUM(V.Sb) in the outer query block). Though query Q2A does not include all of AT in the SCG view (i.e., the set AT is split in the query rewrite), query Q2A is semantically equivalent to original query Q2 because Q2A would produce the same results when run over the same database objects as Q2.

Single-Factored Grouping

To illustrate for SFG-type GBP transformations, the following Query Q1B is obtained by transforming query Q1 according to SFG-type GBP transformation, which applies early grouping on the NAT of the query.

```
Q1B    SELECT SUM(T1.a*V.Cnt)
       FROM T1,   (SELECT T2.x, COUNT(*) Cnt
                   FROM T2
                   WHERE T2.k > 4
                   GROUP BY T2.x) V
       WHERE T1.x = V.x
       GROUP BY T1.g;
```

As the aggregate functions of Q1 do not involve columns of the NAT, grouping on NAT performed in Q1B introduces "factors" by which each original aggregate is multiplied. In query Q1, table T2 is the only NAT, and query Q1B groups table T2 before the join operation with table T1. For every row of table T1, each group of table T2 contributes to the same aggregate by a factor of its cardinality.

Furthermore, notwithstanding example query Q2 having no NAT tables, it is possible to perform SFG-type GBP transformation for query Q2, e.g., with table T1 in the SFG view. Specifically, the following query Q2B is an example rewrite of Q2 using SFG-type GBP transformation:

```
Q2B    SELECT SUM(V.a*V.CNT), SUM(T2.b*V.CNT)
       FROM T2,   (SELECT T1.x, T1.a, COUNT(*) CNT
                   FROM T1
                   GROUP BY T1.x, T1.a) V
       WHERE T2.x = V.x
       AND T2.k > 4
       GROUP BY T1.x;
```

As with query Q2A, query Q2B is semantically equivalent to query Q2 in that the two queries produce the same results. Thus, it is possible to implement SFG-type GBP transformation on a query that has all tables in an aggregate expression, as with query Q2.

Combined Coalesced Factored Grouping

Combined Coalesced Factored Grouping (CCFG) is a variant of GBP transformation that is a combination of SCG and SFG, where early grouping is applied on both AT and NAT in the query. The result of applying such a transformation to Q1 is shown in the following query Q1C.

```
Q1C    SELECT SUM(Vs.Sa*Vf.Cnt)
       FROM     (SELECT T1.x, T1.g, SUM(T1.a) Sa
                 FROM T1
                 GROUP BY T1.x, T1.g) Vs,
                (SELECT T2.x, COUNT(*) Cnt
                 FROM T2
                 WHERE T2.k > 4
                 GROUP BY T2.x) Vf
       WHERE Vs.x = Vf.x
       GROUP BY Vs.g;
```

With respect to example query Q2, it is possible to do both SCG and SFG grouping at the same time, which results in a CCFG-type combination as shown in the following query Q2C:

```
Q2C    SELECT SUM(Vf.a*Vf.CNT*Vc.CNT), SUM(Vc.Sb)
       FROM    (SELECT T1.a, T1.x, COUNT(*) CNT
                FROM T1
                GROUP BY T1.x, T1.a) Vf,
               (SELECT T2.x, SUM(T2.b) Sb, COUNT(*) CNT
                FROM T2
                WHERE T2.k > 4
                GROUP BY T2.x) Vc
       WHERE Vf.x = Vc.x
       GROUP BY Vf.x;
```

Query Q2C is semantically equivalent to query Q2 in that the two queries produce the same results.

GBP Transformations with MIN, MAX, and COUNT

The above GBP transformation examples deal with SUM aggregate queries. Nevertheless, the aggregate in a given query being evaluated for GBP transformation could be MIN, MAX, or COUNT. Specifically, GBP transformations could be applied to queries with these aggregate functions with minor changes to the aggregate expression in the query block outside the GBP view. The following examples illustrate the possibility of application of GBP on such queries, even when all of the query tables are in AT.

For example, for MIN and MAX, the argument in the aggregate expression need not be multiplied by a count factor. To illustrate, consider the following query Q2M that has a MIN aggregate function, which may be transformed using an SCG view as shown in the following query Q2MA, which is semantically equivalent to query Q2M.

```
Q2M    SELECT MIN(T1.a), MIN(T2.b)
       FROM T1, T2
       WHERE T1.x = T2.x and
       GROUP BY T1.g;
Q2MA   SELECT MIN(T1.a), MIN(V.Mb)
       FROM T1,   (SELECT T2.x, MIN(T2.b) Mb
                   FROM T2
                   GROUP BY T2.x) V
       WHERE T1.x = V.x
       GROUP BY T1.g;
```

Furthermore, the following query Q2Ct includes a COUNT(column) aggregate function. Query Q2Ct can be transformed to the following query Q2CtA, which is semantically equivalent to query Q2Ct.

```
Q2Ct   SELECT COUNT(T1.a), COUNT(T2.b)
       FROM T1, T2
```

```
          WHERE T1.x = T2.x
          GROUP BY T1.g;
Q2CtA     SELECT SUM(DECODE(T1.a, NULL, 0, 1)*V.CNT),
            SUM(V.Cb)
          FROM T1, (SELECT T2.x, COUNT(T2.b) Cb, COUNT(*)
              CNT
              FROM T2
              GROUP BY T2.x) V
          WHERE T1.x = V.x
          GROUP BY T1.g;
```

In query Q2CtA, the factor coming from GBP view of table T2 (indicating the number of rows in each group) contributes to the count of T1.a only when the value from column T1.a is not null. As COUNT(T2.b) in query Q2Ct counts non-null values of T2.b, query Q2CtA counts the number of rows in the view V using the COUNT(*) operator.

State Space and Validity

Embodiments consistently apply GBP transformation in a wider variety of circumstances with a wider array of GBP grouping choices by allowing AT to be split between the GBP view and outer query block when evaluating GBP transformation possibilities (or states) for a given query. Specifically, in order to evaluate a query for GBP transformation, which is a cost-based transformation, instance 120 generates multiple "states" for the query, where each state represents a potential configuration for early grouping. To illustrate, when instance 120 receives a request to run a query 104 over database 112, instance 120 evaluates different ways that the query might be rewritten in order to increase the efficiency of running the query. If the query is eligible for GBP transformation, instance 120 generates one or more GBP states for the query. Instance 120 determines the cost of one or more potential implementations of the generated states, and the cheapest potential GBP implementation is identified. The transformation represented by the selected GBP implementation is used to rewrite the query if it is determined that the transformation is worth any additional cost.

More particularly, each GBP state generated for a query divides the tables in the query into two sets: a coalesce set of tables referred to as $\{C\}$ and a factor set of tables referred to as $\{F\}$. In any implementation generated based on a given state, the tables in each set $\{C\}$ and $\{F\}$ are treated as units, where the tables in each set are either all in the same view or are all outside of a view. Specifically, there are multiple possible implementations for each state: the tables included in $\{C\}$ could be pushed into an SCG view while the tables in $\{F\}$ are maintained outside the view; the tables in $\{F\}$ could be pushed into an SFG view while the tables in $\{C\}$ are maintained outside the view, or both SCG and SFG views could be created to produce a CCFG-type state implementation.

The "state space" of GBP transformation for a given query is the set of all possible valid GBP states of the query. Instance 120 determines whether each generated state is a "valid" state using one or more validity rules. Application of validity rules as a condition of inclusion in the state space to be explored for a given query reduces the number of states that must be costed, which reduces the overall cost of implementing GBP transformations. Validity rules generally exclude states that (a) would give incorrect results, or (b) have the potential to be expensive to execute. As an example of a validity rule, in a valid state, the joins between sets $\{C\}$ and $\{F\}$ are equi-joins.

Further, according to another example validity rule, in order for a state to be considered valid, the join graph of the query block must show that the tables in any table set ($\{C\}$ and $\{F\}$) of the state, which is to be included in a GBP view, are connected. Specifically, in a join graph for a query, each table in the query is represented by a vertex and each join condition in the query is represented by an edge between applicable vertices. For example, a join condition in an example query being evaluated is T1.x=T2.y, and, as such, the join graph for the query carries an edge between vertices representing table T1 and table T2. A subset of a join graph is considered connected if there exists one vertex from which all other vertices in the subset are reachable by traversing the edges. Any state in which a sub-graph for one of $\{C\}$ or $\{F\}$ is disconnected, where the disconnected set is to be included in a GBP view, is pruned from the state space for the query, i.e., the state is determined not to be valid. Furthermore, for a state to be valid, all tables of the query cannot be in $\{C\}$.

Prior to embodiments described herein, in order for a state to be valid, at least all tables in AT were included in $\{C\}$, which prevented any query that includes all tables in AT from being considered for GBP transformation. It is noted that, based on this rule, the maximum number of states that can be generated is $3*2^N$ where N is the number of tables that do not belong to AT. According to an embodiment, this validity rule is changed to allow one or more tables in AT to be in $\{F\}$ as long as at least one table from AT is included in $\{C\}$. A state that is valid based on this validity rule is referred to herein as a Relaxed-C(RC) state. This rule expands the applicability of GBP transformations to queries that include all query tables in AT, such as query Q2, and expands the number of possible GBP states that may be generated, even for queries that were eligible for GBP transformation prior to techniques described herein.

Generation of Sub-States

After generating the state space for a given query, possible implementations of each state (referred to as "sub-states") are generated, where a sub-state for a given state defines one of an SCG, an SFG, or a CCFG-based GBP transformation for the query based on $\{C\}$ and $\{F\}$ defined by the state.

According to an embodiment, sub-states are selectively generated and costed for a given state, depending on whether the state is an RC state. Specifically, all possible sub-states are generated for a given valid state when the state includes all AT in $\{C\}$. However, according to an embodiment, when a valid state is an RC state, only a single sub-state that defines an SCG transformation is generated for that state. Selective generation of sub-states limits the increase in state space occasioned by the ability to include only part of AT of a query in $\{C\}$. If sub-states for all of the SCG, SFG, and CCFG variants were generated for each valid state of a query (including RC states), the query state space and the cost of evaluating a GBP transformation for the query would increase significantly. Ensuring the aggregation in SCG view involves at least one of the tables being aggregated reduces factored groups created. Furthermore, generating only SCG sub-states for RC states prevents potential increases in group-by cardinality occasioned by SFC or CCFG views that contain tables in AT, references to which convert to grouping columns in the group-by views as shown in Q2B. Nevertheless, according to an embodiment, the above constraints are relaxed to allow more sub-states, when necessary, or when there is room to explore sub-states more exhaustively.

GBP Transformations for Aggregates with Arithmetic Expressions

Many times, the aggregate expressions of a query include one or more arithmetic expressions, which use arithmetic operators (such as *, +, −, /, —(unary minus)) to arithmetically combine values from database objects. Such arithmetic expressions pose challenges to ensuring that a query rewrite that applies early grouping is semantically equivalent to the original query, especially when the arithmetic expressions are complex (such as arithmetic expressions that involve multiple different arithmetic operators). This difficulty is a driving factor in preventing GBP transformations from being applied to queries with complex arithmetic expressions prior to techniques described herein.

For the following discussion, the presence of a group-by clause in the original query is immaterial and the design applies to queries that have an explicit group-by clause as well as queries that do not. According to embodiments, for an RC state, it is possible for only some of the column references in an arithmetic expression to be included in an GBP view. Thus, it is important to ensure that the GBP transformation for such queries results in rewritten queries that are semantically equivalent to the original queries. To illustrate, the following query Q3 includes an arithmetic expression, which combines columns from table T1 and table T2 using a '*' operator (multiplication).

```
Q3      SELECT SUM(T1.a*T2.b)
        FROM T1, T2
        WHERE T1.x = T2.x
        GROUP BY T2.g;
```

Because both tables T1 and T2 in the query are included in the aggregate expression (SUM(T1.a*T2.b)), T1 and T2 are aggregating tables (belong to set AT) for the query.

Prior to techniques described herein, Q3 would not be eligible for GBP transformation because all of the query tables are in AT. Nevertheless, query Q3 can be transformed into the following query Q3A by performing early grouping on table T2, as follows:

```
Q3A     SELECT SUM(T1.a*V.Sb)
        FROM T1,    (SELECT T2.x, T2.g, SUM(T2.b) Sb
                    FROM T2
                    GROUP BY T2.x, T2.g) V
        WHERE T1.x = V.x
        GROUP BY V.g;
```

Query Q3A is guaranteed to be semantically equivalent to query Q3 because the query rewrite takes advantage of the distributive property of multiplication. In general, a distributive operation (e.g., multiplication or division) "distributes" over addition and subtraction. For example: x*(y+z)=x*y+x*z, and also (x−y)/z=x/z−y/z. To illustrate, the arithmetic expression in the aggregate expression of query Q3 is "T1.a*T2.b". The operator "SUM" is distributive over multiplication and division in that an arithmetic expression involving only multiplication and/or division, in a SUM aggregate expression, can be transformed using the distributive property. For example, the aggregate expression shown below, where AT={T1, T2, T3}, can be transformed as follows if {C}={T3}, where V is the SCG view, and V.x=SUM(T3.x):

$$SUM(T1.x*T2.x*T3.x)=SUM(T1.x*T2.x*V.x)$$

It is noted that, since early grouping can be performed for table T2 in query Q3, as indicated in query Q3A above, early grouping could similarly be performed for table T1, relying on the distributive property to ensure that the resulting query is semantically equivalent to query Q3. However, a rewritten query that included CCFG-type GBP grouping that performed early grouping for both T1 and T2 would not be semantically equivalent to the original query Q3. In such cases involving an RC state, the database server instance would be prevented from generating a CCFG variant substate for the RC state, even if the validity rules were relaxed in order to cost a greater variety of GBP sub-states for the query.

Arithmetic Expression Normalization

Arithmetic expressions in queries may be arbitrarily complex, such as "SUM((T1.a+T2.b)*(T1.x*T2.y−T3.y*(T2.z+T4.z))". In this nested format, it is not entirely clear how to apply the distributive property to rewrite a query that includes this expression in order to produce a rewritten query, based on an RC state, that is equivalent to the original query. For example, for an RC state that includes only T2 in {C}, the above example aggregate in an outer query block cannot be transformed by a straightforward replacement of the references of T2 with their grouped SUMs, because: SUM((T1.a+T2.b)*(T1.x*T2.y−T3.y*(T2.z+T4.z))≠SUM((T1.a+V.Sb)*(T1.x*V.Sy−T3.y*(V.Sz+T4.z)), where:

V is the SCG view,
V.Sb=SUM(T2.b),
V.Sy=SUM(T2.y), and
V.Sz=SUM(T2.z).

Thus, according to an embodiment, arithmetic expressions—in aggregate expressions with aggregate functions that are distributive over multiplication and division within a query that is being evaluated for query rewrite to apply a GBP transformation—are normalized to allow for application of the distributive query modification strategy, as described in further detail below.

For purposes of normalization discussion herein, a "base term" is a term that is either a column reference in a table or a literal constant (e.g., T1.a, and '5' are base terms). Also, a "product term" is an arithmetic term that contains multiple base terms that are combined with only multiplication or division operators (e.g., T1.a*T2.b/T3.c*4 is a product term comprising the base terms T1.a, T2.b, T3.c, and '4'). A "sum of products" (SOP) expression is an expression that comprises the addition or subtraction of one or more product terms. For example, "x*y*z+a*b−p*q/r" is an SOP expression, where the following are product terms of the SOP expression: "x*y*z"; "a*b"; and "p*q/r".

Normalization of an arithmetic expression is the process of converting the expression to an equivalent SOP form. For instance, the SOP form of the arithmetic expression "(a+b)(xy−y(z+xa))" is "axy+bxy−yza−xyaa−yzb−xyab" (where the multiplication operator is implicitly shown). Similarly, an aggregate expression with a complex arithmetic expression, such as "SUM(T1.x*(T2.x*T3.x−T2.y))", can be normalized, e.g., to "SUM(T1.x*T2.x*T3.x −T1.x*T2.y)".

Distributive Query Modification Strategy

The distributive property may be used as a basis for a systematic distributive query modification strategy (as described in detail below) to be applied to any arithmetic expression in SOP form. Thus, in order to rewrite a given query based on an RC state, instance 120 normalizes any arithmetic expressions in the aggregate expression(s) of the query and then applies the distributive query modification strategy to each term in the normalized expression, which ensures that the rewritten query is semantically equivalent to the original query.

According to an embodiment, the distributive query modification strategy comprises analyzing each product term individually to determine, for a query rewrite, (a) one or more transformations to perform for the product term in the outer query block, and (b) one or more expressions to include in the GBP view for the product term.

To illustrate, consider an aggregate expression that is in SOP form, "SUM(T1.x*T2.x*T3.x−T1.x*T2.y)", where AT={T1, T2, T3}. If a GBP state is generated such that {C} includes tables T2 and T3 (i.e., an RC state), the SCG-type GBP transformation of each product term is as follows:

For the product term "T1.x*T2.x*T3.x", the rewritten product term in the outer query block is "T1.x*V.Sx" and the SCG view includes "V.Sx=SUM(T2.x*T3.x)".

For the product term "T1.x*T2.y", the rewritten product term in the outer query block is "T1.y*V.Sy" and the SCG view includes "V.Sy=SUM(T2.y)".

Thus, systematically using the distributive query modification strategy for each product term results in a rewritten query that is semantically equivalent to the original query. The query modification rules for determining the rewritten product term for the outer query block and the GBP view component for each product term are described in detail below.

Performing GBP Analysis for Queries with Arbitrarily-Complex Aggregate Expressions FIG. 2 depicts a flowchart 200 for rewriting a query that references a plurality of database objects, includes one or more aggregate expressions, and includes a particular join expression, where the plurality of database objects comprises two or more aggregate database objects that are referenced in the one or more aggregate expressions. For example, instance 120 receives a request to run the following query Q4:

| Q4 | SELECT SUM((T1.a + T2.b)*(T2.c − T1.d)) FROM T1, T2, T3 WHERE T1.x = T2.x AND T2.y = T3.y GROUP BY T2.g; |
|---|---|

Figures 3, 4:
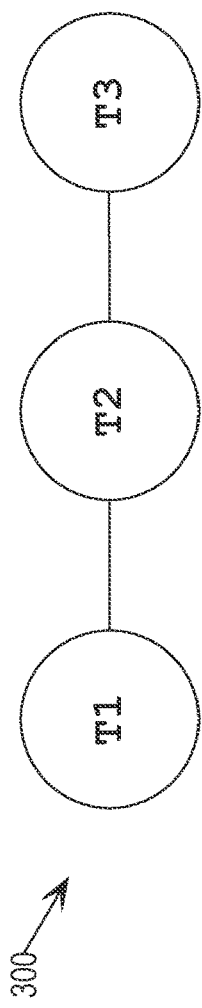
FIG. 3 depicts a join graph for an example query.
FIG. 4 depicts a table with example GPB states generated by a database server instance for an example query.

Query Q4 includes a complex arithmetic expression, "(T1.a+T2.b)*(T2.c−T1.d)", in the SUM aggregate expression. In query Q4, the tables T1 and T2 are in AT. FIG. 3 depicts a join graph 300 of query Q4, which reflects the two join conditions, one between T1 and T2, and one between T2 and T3. According to an embodiment, rewriting a query such as Q4 comprises steps 202-206 of flowchart 200.

At step 202 of flowchart 200, one or more valid states are identified for a particular query, where each valid state, of the one or more valid states, comprises: a coalesce set of database objects that comprises at least one aggregate database object of the two or more aggregate database objects, and a factor set of database objects that comprises one or more database objects, of the plurality of database objects, other than the coalesce set of database objects identified by said each valid state. For example, instance 120 generates states, for query Q4, that represent all possible combinations of tables from Q4 in {C} and {F}. Instance 120 determines which of the states are valid according to a set of validity rules, e.g., as described in detail above.

Table 400 of FIG. 4 includes a set of example states generated by instance 120 for query Q4. In table 400, each row represents a different example state. It is noted that, if all of AT were required to be in {C}, then the only states from table 400 that would be generated for Q4 are [1 1 1] and [1 1 0]. As illustrated in table 400, the number of valid states that are able to be included in the state space for query Q4 using RC state validity rules is much greater than the two states what can be costed when all of AT is required to be in {C}.

In table 400, the depicted states define different combinations of T1, T2, and T3 to be included in {C} and {F}, as indicated by the state identifiers in column 402. For example, state [1 1 1] includes each of T1, T2, and T3 in {C} (as shown in column 404), which leaves {F} with an empty set (as shown in column 406). As another example, state [1 1 0] includes tables T1 and T2 in {C}, which leaves table T3 in {F}. Column 408 indicates the disposition of the AT tables, i.e., whether each state includes, in {C}: (a) all of AT (C⊇AT); (b) a strict subset of AT ((C)⊂AT); or (c) neither (C!⊇AT).

Further, column 412 of table 400 indicates which sub-state(s) are generated for each state. For example, according to the validity rule that indicates that not all tables in the query can be in {C}, state [1 1 1] is not a valid state; accordingly, no sub-states are generated for this state, as indicated in column 412. Similarly, state [0 0 1] includes no AT tables in {C}. As such, this state is not valid and no sub-states are generated for this state. As another example, state [1 1 0], which includes all AT in {C}, is considered to be a valid state. Also, because all of AT is included in state [1 1 0], all three possible sub-states are generated for that state, as shown in column 412.

It is noted that column 410 of the table indicates which of {C} and {F} of each state are connected, according to join graph 300 (FIG. 3). When a particular set of a state is not connected, no sub-states with a view based on the unconnected set are generated, which avoids the need to perform costly operations for sets that are not joined (just as cross products). For example, state [0 1 1] includes at least one AT (table T2) in {C}. As such, based on the sub-state generation rules indicated above, instance 120 could potentially generate an SCG-type sub-state for state [0 1 1] (but not any sub-states involving SFG-type views). The tables of {C} are connected (as indicated in column 410), and, as such, the SCG-type sub-state is generated for the state.

As another example, state [1 0 1] includes at least one AT (table T1) in {C}. As such, based on the sub-state generation rules indicated above, instance 120 could generate an SCG-type sub-state for the state. However, as indicated in column 410, only {F} is connected for this state, and {C} is not connected. Specifically, in this state, {C} includes tables T1 and T3 and, as shown in graph 300, table T1 is not directly connected to table T3. It is noted that the table in {F} (table T2) is considered connected given that all tables are reachable by themselves in the join graph, which means that {F} is a connected set. Because {C} is not connected, and the state is not eligible to generate any views based on {F}, instance 120 does not generate any sub-states for state [1 0 1].

At step 204, a particular valid state, of the one or more valid states, is selected, where the particular valid state comprises: a particular coalesce set of database objects that includes less than all of the two or more aggregate database objects, and a particular factor set of database objects. For example, instance 120 identifies a particular sub-state based on which to rewrite query Q4, e.g., the SCG sub-state generated for state [0 1 0], which is an RC state having only one AT table (table T1) in {C}.

Modifying a Sum Aggregate Expression for an RC State

At step 206, a rewritten query is generated, where the rewritten query applies early grouping, before applying the particular join expression, for at least one of: the particular coalesce set of database objects, and the particular factor set of database objects. For example, instance 120 generates a rewritten query for query Q4 that includes a GBP view that implements early grouping for the tables in {C} of state [0 1 0]. Specifically, for the selected RC state [0 1 0] for query Q4, instance 120 rewrites the query to include a GBP view, V, for {C} and table T2 is placed inside the view in order to apply an SCG-type GBP transformation for Q4. Thus, grouping is performed within the view prior to applying the join expression of query Q4.

Because GBP transformations cannot always be applied in the same way to aggregate expressions having different aggregate functions, according to embodiments described herein, database server instance 120 applies aggregate function-specific modification rules to produce a rewritten query that applies GBP transformation. Thus, when the query includes a SUM aggregate function, as with example query Q4, instance 120 applies SUM-specific modification rules to any arithmetic expressions in the SUM aggregate expression for sub-states that are based on an RC state.

According to an embodiment, application of SUM-specific modification rules comprises normalizing any arithmetic expression associated with a SUM aggregate function to produce an expression in SOP form. For example, instance 120 normalizes the aggregate expression of query Q4 as follows: "(T1.a+T2.b)*(T2.c−T1.d)" becomes "T1.a*T2.c+ T2.b*T2.c−T1.a*T1.d−T2.b*T1.d".

Once normalized, the SUM-specific modification rules are applied to the expression to determine a view expression and an outer query block expression for each product term within the normalized arithmetic expression. Transformation of SUM aggregate expressions is non-trivial and varies based on the GBP sub-state selected for query rewrite and the composition of the SOP expression in the aggregate expression. It is noted that, for RC states that involve the aggregate operator SUM, for any table $Tx \in \{C\}$, if a column reference of Tx appears in the denominator of a '/' operator (and the same reference does not appear in the numerator) in any product term of the SOP expression, the associated RC state is invalid. This validity rule is enforced for RC states that involve the aggregate operator SUM because the operator SUM is not distributive with respect to the denominator of division (i.e., a/(x1+x2)!=a/x1+a/x2).

According to an embodiment, application of the SUM-specific modification rules depends on whether any (or all) table references in a given product term are for tables included in {C}. Thus, for each product term, "P", of the SOP expression in query Q4, instance determines whether any (or all) of the table references of the product term are in {C}.

Modification Rules when No Table in a Product Term is in Set {C}

If no table of a product term P is in {C}, then (a) if not yet present, an aggregate COUNT(*) is added to the GBP view, where the aggregate counts the cardinality of the groups generated by the view; and (b) the outer query block is caused to include P multiplied by the result of COUNT(*) in the view. This COUNT(*) factor is one per term, and not per table. Specifically, only one counter is needed for the entire term because the count comes from the GBP view that may include multiple aggregating tables, and for purposes of the term in the outer query block, the value that is relevant is the cardinality of each of the final groups of the GBP view. To illustrate, returning to example rewrite of query Q4 based on state [0 1 0], P=T1.a*T1.d, and, accordingly, no table of P is in {C}. As such, in the rewritten query, instance 120 modifies the corresponding product term to be T1.a*T1.d*V.Cnt, where V.Cnt represents the cardinality of the groups generated by an GBP view V.

Application of these modification rules results in a rewritten query that is semantically equivalent to the original query. Specifically, for the aggregate function SUM, when a product term in the outer query block does not contain a table that is in {C}, for each row of the outer table being joined to the GBP view, as grouping inside the GBP view reduces the cardinality of rows by factors of each group, the term is aggregated (SUM) as many times as the cardinality of that group. Otherwise the product term in the outer query is added only once per group, when the term should be added for every row of the GBP view. As the value of the outer term is the same for every row of the GBP view, the number of rows per group is counted and multiplied with the outer term in the rewritten query.

The following query Q5 is used to show that a query rewrite using these query modification rules results in a rewritten query that is semantically equivalent to the original query:

| Q5 | SELECT SUM(T1.x) |
|---|---|
| | FROM T1, T2 |
| | WHERE T1.j = T2.j |
| | GROUP BY T2.r; |

In this example, tables T1 and T2 both have 3 rows, where the rows of T2 are referred to as $r_1$, $r_2$, and $r_3$. Also, column values for the rows in T1.x are $x_1$, $x_2$, $x_3$, where the subscript denotes the row number within table T1. Further, all rows of T1 join with all rows of T2. The desired result (before replacement) is:

$$S_{original} = x_1 + x_1 + x_1 + \text{(for first row of } T2\text{)}$$
$$x_2 + x_2 + x_2 + \text{(for second row of } T2\text{)}$$
$$x_3 + x_3 + x_3 \text{ (for first row of } T2\text{)}$$

Instance 120 evaluates query Q5 for rewrite using GBP transformation, and selects a GBP state for the rewrite where T1 $\notin \{C\}$ and T2 $\in C$ (and the rules for state generation are relaxed to allow no AT tables to be included in {C}). Given the GBP state, the product term SUM(T1) does not contain any tables in {C}, and as such, instance 120 applies the SUM-specific query modification rules to Q5 to produce following query Q5A:

| Q5A | SELECT SUM(T1.x*V.Cnt) | |
|---|---|---|
| | FROM T1, | (SELECT T2.j, T2.r, COUNT(*) Cnt |
| | | FROM T2 |
| | | GROUP BY T2.j, T2.r) V |
| | WHERE T1.j = V.j | |
| | GROUP BY V.r; | |

When run, view V of query Q5A forms two groups where $r_1$ and $r_2$ of T2 fall into one group and $r_3$ of T2 falls into another group. Thus, the results of COUNT(*) of the groups are $C_{group\_1}=2$ and $C_{group\_2}=1$, respectively. The final result computation after replacement following this rule is as follows:

$$S_{rewrite} = x_1 * C_{group\_1} + x_1 * C_{group\_2} + [ = x_1 * 2 + x_1 * 1]$$
$$x_2 * C_{group\_1} + x_2 * C_{group\_2} + [ = x_2 * 2 + x_2 * 1]$$
$$x_3 * C_{group\_1} + x_3 * C_{group\_2} \quad [ = x_3 * 2 + x_3 * 1]$$

Thus, it can be deduced from the above that $S_{original}$ is the same as $S_{rewrite}$, and that query Q5A is the semantic equivalent of query Q5.

Note that the same principle holds when a product term has multiple tables that are not included in {C}. For example, a query being evaluated for GBP transformation includes the aggregate expression SUM(T1.x*T3.a*T4.b). For an RC state in which T1, T3, T4∉{C} (again, relaxing the rules for state generation to allow no AT tables to be included in {C}), only one COUNT is needed from the GBP view to multiply with the product term, for each group, because the COUNT is the factor of the group in the GBP view and is not a function of the number of the tables in the outer query block.

Modification Rules when One or More Tables in a Product Term are in Set {C}

If one or more, but not all, of the tables in product term P are in {C}, then the term is split into two sub-terms P1 and P2 where P1∈{C} and P2∉{C}, and (a) an aggregate SUM (P1) is added to the view, and (b) the outer query block is caused to include P2 multiplied by the result of SUM (P1) from the view. For example, P=T1.x*T3.y*T4.z for an RC state where T3, T4∈{C}, and T1∉{C}. Thus, at least one table of P is in {C}, but not all tables of P are in {C}. As such, instance 120 splits the term into P1 (T3.y*T4.z) and P2 (T1.x) and modifies the product term in the outer query block of the rewritten query to be T1.x*V.Syz, and adds SUM(T3.y*T4.z) Syz in the GBP view V.

Application of these modification rules results in a rewritten query that is semantically equivalent to the original query. For the aggregate function SUM, when a product term includes at least one table from {C}, the distributive property is applied for query rewrite. Specifically, for every row in the outer query block, the terms of the tables in {C} are removed and these terms are aggregated (SUM) inside the view. Replacing the result back in the outer query through multiplication is correct based on the distributive property. Specifically, application of these modification rules replaces SUM(x*y) in the outer query with SUM(x*SUM(y)) across all x and y, where SUM(y) comes from the GBP view.

The following query Q6 is used to show that a query rewrite using these query modification rules results in a rewritten query that is semantically equivalent to the original query:

| Q6 | SELECT SUM(T1.x*T2.y) FROM T1, T2 WHERE T1.j = T2.j GROUP BY T2.r; |
|---|---|

In this example, tables T1 and T2 both have 3 rows, where the rows of T2 are referred to as $r_1$, $r_2$, and $r_3$. Also, column values for the rows in T1.x are $x_1$, $x_2$, $x_3$, where the subscript denotes the row number within table T1. Further, all rows of T1 join with all rows of T2. The desired result (before replacement) is, for all the row combinations (assuming they satisfy the join) that ∈T1, T2:

$$S_{original} = x_1 * y_1 + x_1 * y_2 + x_1 * y_3 +$$
$$x_2 * y_1 + x_2 * y_2 + x_2 * y_3 +$$
$$x_3 * y_1 + x_3 * y_2 + x_3 * y_3$$

Instance 120 evaluates query Q6 for rewrite using GBP transformation, and selects a GBP state for the rewrite where T1∉{C} and T2∈C. Given the GBP state, the product term SUM(T1.x*T2.y) contains one table in {C}, and as such, instance 120 applies the above query modification rules to Q6 to produce following query Q6A:

| Q6A | SELECT SUM(T1.x*V.Sy) FROM T1, (SELECT T2.j, T2.r, SUM(T2.y) Sy FROM T2 GROUP BY T2.j, T2.r) V WHERE T1.j = V.j GROUP BY V.r; |
|---|---|

When run, view V of query Q6A forms two groups where $r_1$ and $r_2$ of T2 fall into one group and $r_3$ of T2 falls into another group. Thus, the GBP view computes two sums: Sy1=($y_1+y_2$) and Sy2=$y_3$. The final result computation after replacement following this rule is as follows:

$$S_{rewrite} = x_1 * Sy1 + x_1 * Sy2 + [ = x_1 * (y_1 + y_2) + x_1 * y_3]$$
$$x_2 * Sy1 + x_2 * Sy2 + [ = x_2 * (y_1 + y_2) + x_2 * y_3]$$
$$x_3 * Sy1 + x_3 * Sy2 \quad [ = x_3 * (y_1 + y_2) + x_3 * y_3]$$

Thus, it can be deduced from the above that $S_{original}$ is the same as $S_{rewrite}$, and that query Q6A is the semantic equivalent of query Q6.

Furthermore, if all tables of product term P are in {C}, then the term is moved into the GBP view. Specifically, (a) an aggregate SUM (P) is added to the GBP view, and (b) the outer query block is caused to include a reference to the result of SUM (P) in the view. For example, P=T3.y*T4.z for an RC state where T3, T4∈{C}. Thus, all of the tables of P are in {C}. As such, instance 120 modifies this product term to be V.Syz in the outer block of the rewritten query, and adds SUM(T3.y*T4.z) Syz in a GBP view V.

The explanation of correctness of this rule follows the explanation of correctness of the above rule where one or more, but not all, tables of the product term are in {C}, where one of the sub-terms (P2) includes the null set (and is effectively replaced by '1') because there are no table references in P for tables not in {C}.

Example Application of Query Modification Rules

Returning to the illustration of step 206, each product term of the normalized aggregate expression of query Q4 ("T1.a*T2.c+T2.b*T2.c−T1.a*T1.d−T2.b*T1.d") is evaluated based on the sum-specific modification rules. Continuing with the example used to illustrate flowchart 200 above, the selected RC state for query Q4 is [0 1 0], and the selected sub-state is the SCG sub-state. Accordingly, instance 120 rewrites the query to include an SCG view, V, and modifies each product term in the normalized aggregate expression in order to place table T2 inside the SCG view. Analysis of each product term is as follows:

For the product term "T1.a*T2.c", one, but not all, of the table references are from {C}, i.e., table T2. Thus, the term is split into P1 (T2.c) and P2 (T1.a). According to the SUM-specific modification rule for when some but not all of the table references in the product term are in {C}, instance 120 modifies this product term to be "T1.a*V.Sc" in the outer query block of the rewritten query, and adds "SUM(T2.c) Sc" to SCG view V.

For the product term "T2.b*T2.c", all of the table references are from {C}, i.e., both references are to table T2. Thus, the term is moved into the SCG view. Specifically, according to the SUM-specific modification rule for when all of the table references in the product term are in {C}, instance 120 modifies this product term to be "V.Sbc" in the outer query block of the rewritten query, and adds "SUM(T2.b*T2.c) Sbc" to view V.

For the product term "T1.a*T1.d", none of the table references are from {C}, i.e., both references are table T1. Thus, according to the SUM-specific modification rule for when none of the table references in the product term are in {C}, instance 120 modifies this product term to be "T1.a*T1.d*V.CNT" in the outer query block of the rewritten query, and adds "COUNT(*) CNT" to view V, given that there is not already a COUNT(*) in the view.

For the product term "T2.b*T1.d", one, but not all, of the table references are from {C}, i.e., table T2. Thus, the term is split into P1 (T2.b) and P2 (T1.d). According to the SUM-specific modification rule for when some but not all of the table references in the product term are in {C}, instance 120 modifies this product term to be "T1.d*V.Sb" in the outer query block of the rewritten query, and adds "SUM(T2.b) Sb" to view V.

Accordingly, instance 120 rewrites query Q4 to produce rewritten query Q4A as follows:

```
Q4A  SELECT SUM(T1.a*V.Sc + V.Sbc - T1.a*T1.d*V.CNT -
            T1.d*V.Sb)
     FROM T1, T3,  (SELECT T2.x, T2.y, T2.g, SUM(T2.c) Sc,
                          SUM(T2.b*T2.c) Sbc, SUM(T2.b) Sb,
                          COUNT(*) CNT
                    FROM T2
                    GROUP BY T2.x, T2.y, T2.g) V
     WHERE T1.x = V.x
       AND V.y = T3.y
     GROUP BY V.g;
```

As a further illustration, instance 120 selects the RC state [0 1 1] for query Q4. Accordingly, instance 120 rewrites the query to include an SCG view, V, for {C} and modifies each product term in the normalized aggregate expression in order to place tables T2 and T3 inside the SCG view. Because T3 is not an aggregate table, analysis of each product term proceeds as indicated above for state [0 1 0]. However, the join clause between tables T2 and T3 is moved into the SCG view. Accordingly, instance 120 rewrites query Q4 to produce rewritten query Q4B as follows:

```
Q4B  SELECT SUM(T1.a*V.Sc + V.Sbc - T1.a*T1.d*V.CNT -
            T1.d*V.Sb)
     FROM T1, (SELECT T2.x, T2.y, T2.g, SUM(T2.c) Sc,
                    SUM(T2.b*T2.c) Sbc, SUM(T2.b) Sb,
                    COUNT(*) CNT
               FROM T2, T3
               WHERE T2.y = T3.y
               GROUP BY T2.x, T2.y, T2.g) V
     WHERE T1.x = V.x
     GROUP BY V.g;
```

As a further illustration, instance 120 selects the RC state [1 0 0] for query Q4. Accordingly, instance 120 rewrites the query to include an SCG view, V, for {C} and modifies each product term in the normalized aggregate expression in order to place table T1 inside the SCG view. Analysis of each product term is similar to the analysis indicated above for state [0 1 0], except with T1 in {C} and T2 not in {C}. Accordingly, instance 120 rewrites query Q4 to produce rewritten query Q4C as follows:

```
Q4C  SELECT SUM(V.Sa*T2.c + T2.b*T2.c*V.Cnt - V.Sad -
            T2.b*V.Sd)
     FROM T2, T3,  (SELECT T1.x, SUM(T1.a) Sa, COUNT(*) Cnt,
                          SUM(T1.a*T1.d) Sad, SUM(T1.d) Sd
                    FROM T1
                    GROUP BY T1.x) V
     WHERE V.x = T2.x
       AND T2.y = T3.y
     GROUP BY T2.g;
```

By normalizing the complex arithmetic expression in the aggregate expression, and then systematically applying the distributive query rewrite strategy to each product term, the resulting rewritten queries Q4A, Q4B, and Q4C indicated above are each semantically equivalent to the original query Q4.

Aggregate Function-Specific Modification Rules: MIN, MAX

Furthermore, the transformation is applied in a similar way, as described above for SUM aggregate functions, to aggregate functions MIN and MAX when values in the table columns referred to in the MIN/MAX aggregate expression are known to be non-negative. Specifically, if there are constraints on columns enforcing positive values on the table columns in a given product term of a MIN/MAX aggregate expression, then the product term is split into two sub-terms P1 and P2 where P1∈{C} and P2∉{C}, and (a) an aggregate MIN/MAX (P1) is added to the GBP view, and (b) the rewritten aggregate expression includes P2 multiplied by the result of MIN/MAX (P1) in the view. This case is similar to the SUM case where it is known that that MIN (T1.x*T2.y)=MIN(T1.x*MIN(T2.y)) given that all of the values of both T1.x and T2.y are non-negative. Thus, the transformation in this case follows the pattern indicated above for SUM-specific modification rules.

However, the transformation cannot be applied, in the way described above for SUM aggregate functions, to aggregate functions MIN and MAX when there is the potential for negative values in the aggregate expression, as negative values can change the result of a MIN/MAX aggregate expression. For example, if T1.x and/or T2.y can be negative, then MIN(T1.a*T2.b) is not the same as MIN (T1.a*MIN(T2.b)).

Thus, according to an embodiment, when an aggregate expression of a query is based on a MIN or MAX aggregate function where one or more of the values of a given product term in the expression may be negative, instance 120 applies the following general MIN/MAX-specific modification rules to the product term when being rewritten for sub-states that are based on an RC state. According to an embodiment, as with the SUM-specific modification rules, application of the general MIN/MAX-specific modification rules comprises normalizing any arithmetic expression associated with a MIN or MAX aggregate function to produce a sum of product terms. Once normalized, a view expression and an outer query block expression are determined for each product term within the normalized arithmetic expression.

For MIN/MAX aggregate functions, each product term in the normalized arithmetic expression is individually analyzed to determine what modification is needed. As with SUM, the modification rules are dependent on whether any (or all) table references in a given product term refer to tables included in {C}. Thus, for each product term, "P", of an SOP expression in the outer query block that may include negative values, for aggregate operator MIN or MAX: if not all of the tables in P are in {C}, then (a) each table in {C} in the product term is included as a grouping key in the GBP view, and (b) the rewritten aggregate expression replaces each reference to each respective table column in {C} to a reference to the column in the GBP view. However, if ALL tables of P are in {C}, then P is replaced by the aggregate from the GBP view.

Specifically, for any set of rows, MIN(x*y) is the same as computing the MIN across the groups where each group has computed MIN(x*y) for the group. Thus, MIN(x*y)=MIN (for each group g, MIN(x*y)). However, when not all tables of the product term are in {C}, then the minimum computed by each group cannot reliably be combined to get the global minimum in all cases due to the potential presence of negative values in more than one table of the aggregate expression.

For example, the query Q7 includes a MIN aggregate function:

| Q7 | SELECT MIN(T1.a*T2.b + T2.c*T2.b) FROM T1, T2 WHERE T1.x = T2.x GROUP BY T1.g; |
|---|---|

Instance 120 evaluates query Q7 for GBP transformation, and selects an RC state for query rewrite where T2 E {C}. The arithmetic expression in Q7 is in SOP form, so no normalization is required. Instance 120 transforms query Q7 to rewritten query Q7A according to the general MIN-specific query modification rules by evaluating each product term as follows:

For the product term "T1.a*T2.b", some but not all of the table references are from {C}. Thus, according to the MIN/MAX-specific modification rule for when not all of the table references in the product term are in {C}, instance 120 modifies this product term in the outer query block to refer to the table columns from T2 from view V, i.e., "T1.a*V.b" in the rewritten query, and adds T2.b as a grouping key in view V. Note that, if T1.a and T2.b can both have negative values it can be noticed that MIN(T1.a*T2.b)!=MIN(T1.a*MIN(T2.b)). As indicated above, in such cases, the rows of T2 are grouped using the columns as grouping keys.

For the product term "T2.c*T2.b", all of the table references are from {C}, i.e., both references are to table T2. Thus, the term is moved into the GBP view. Specifically, according to the MIN/MAX-specific modification rule for when all of the table references in the product term are in {C}, instance 120 modifies this product term in the outer query block to be V.Mcb, and adds "MIN(T2.c*T2.b) Mcb" in view V.

Accordingly, instance 120 rewrites query Q7 to be rewritten query Q7A as follows:

| Q7A | SELECT MIN(T1.a*V.b + V.Mcb) FROM T1, (SELECT T2.x, T2.g, T2.b, MIN(T2.c*T2.b) Mcb FROM T2 GROUP BY T2.x, T2.g, T2.b) V WHERE T1.x = V.x GROUP BY T1.g; |
|---|---|

By normalizing the complex arithmetic expression in the aggregate expression, and then using the distributive query rewrite strategy for each product term, the resulting rewritten query Q7A is semantically equivalent to the original query Q7.

Note that it is also possible to track the minimum value and maximum value in the GBP view and then compute the result in the outer query block as shown in rewritten query Q7B below, which is an alternate rewrite of query Q7 for an RC state where T2 E {C}. According to an embodiment, this strategy is adopted when the grouping strategy described above introduces grouping keys with high cardinality.

| Q7B | SELECT MIN(case when (T1.a < 0) then T1.a*maxT2b+ V.Mcb else T1.a*minT2b+ V.Mcb end) FROM Ti, (SELECT T2.x, MIN(T2.c*T2.b) Mcb MAX(T2.b) maxT2b, MIN(T2.b) minT2b FROM T2 GROUP BY T2.x) V WHERE T1.x = V.x GROUP BY T1.g; |
|---|---|

Rules for Transformation of Count Aggregate

Example query Q8, below, includes a COUNT-type aggregate expression. Query Q8 can be transformed to query Q8A using COUNT-specific query modification rules.

| Q8 | SELECT COUNT(T1.x * (T2.a − T1.y/T2.b)) FROM T1, T2 WHERE T1.x = T2.x GROUP BY T2.g; |
|---|---|

Such types of queries may not be common and are included here to show the variations for each aggregate function. Specifically, for COUNT aggregate functions, the count is incremented when all values in the expression are non-NULL values. Thus, the result of any arithmetic expression for the COUNT aggregate function does not affect the result of the COUNT function. For example, COUNT (T1.x*T2.y/T3.z) is semantically equivalent to COUNT (T1.x+T2.y+T3.z).

Therefore, according to an embodiment, conversion to an SOP expression is not required for a COUNT-type aggregate expression. In this embodiment, all arithmetic operators in the COUNT expression are replaced by a low-cost arithmetic operator, such as "+", which reduces the CPU overhead in computing the aggregate expression. In this simplified expression, all database object references (e.g., column references) are retained to maintain the semantics of the count expression. Embodiments are not limited to the '+' operator, and may be performed using any low-cost arithmetic operator.

Thus, according to the COUNT-specific query modification rules, instance 120 identifies all column references from tables in {C} in the COUNT-type aggregate expression. The aggregate in the GBP view for {C} is populated with a "simple" COUNT expression that is formed by adding all such column references.

Similarly, all column references in the expression from tables not in {C} are identified, and a SUM expression, which involves a DECODE expression to count applicable rows, is formed by adding all such column references, as shown in rewritten query Q8A below. Specifically, the COUNT expression in the view counts all qualified rows in each group, and the expression in the outer query counts all qualified rows from all of the groups in the view. The DECODE expression, which determines whether the simplified expression generated using column references for tables not in {C} is NULL, is used as an argument to a SUM aggregate expression. The DECODE expression is multiplied by the count determined from the view such that, if any particular group's row count would be nullified by a NULL from a column reference for a table not in {C}, the count value is multiplied by 0, and if not (i.e., all factor column references are non-NULL), the count from the group is multiplied by 1 and, consequently, included in the SUM. Finally, an NVL is used to ensure that, if the result of the SUM is NULL, the result of the expression is '0'.

For example, query Q8 is rewritten based on an RC state in which T1∉{C} and T2∈{C}, where the original aggregate from Q8 is COUNT(T1.x*(T2.a−T1.y/T2.b)). Instance 120 generates the following aggregate expression to be included in the GBP view for {C}: "COUNT(T2.a+T2.b) Cnt", which includes all references to tables in {C}. The aggregate that is generated in the outer query block of the implementation is "NVL(<agg>, 0)", where <agg>="SUM (DECODE(T1.x+T1.y, NULL, 0, 1)*V.Cnt)", as shown in rewritten query Q8A below.

```
Q8A   SELECT NVL(SUM(DECODE(T1.x + T1.y, NULL, 0,
      1)*V.Cnt), 0)
         FROM T1,  (SELECT T2.x, T2.g, COUNT(T2.a + T2.b) Cnt
                    FROM T2
                    GROUP BY T2.x, T2.g) V
         WHERE T1.x = V.x
         GROUP BY V.g;
```

Nevertheless, if the column references not in {C} (e.g., T1.a) is known to be non-null, the DECODE function can be omitted from the rewritten query.

Database Overview

Techniques described herein are used in the context of database management systems. Therefore, a description of an example DBMS is provided.

Generally, a server, such as a database server, or application is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g., Oracle Database 11 g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the techniques described herein are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected vertices that share access to the same database. Typically, the vertices are interconnected via a network and share access, in varying degrees, to shared storage, e.g. shared access to a set of disk drives and data blocks stored thereon. The vertices in a multi-node database system may be in the form of a group of computers (e.g., workstations, personal computers) that are interconnected via a network. Alternately, the vertices may be the vertices of a grid, which is composed of vertices in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple vertices in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A database dictionary for database 112 may comprise multiple data structures that store database metadata, which is a representation of the physical schema of a data store. A database dictionary may, for example, comprise multiple files and tables. Portions of the data structures may be cached in main memory of a database server. When a database object is said to be defined by a database dictionary, the database dictionary contains metadata that defines properties of the database object (which are the physical properties of the database object). For example, metadata in a database dictionary defining a database table may specify the column names and datatypes of the columns, and one or more files or portions thereof that store data for the table. Metadata, reflecting the physical schema of database 112, stored in the database dictionary, may define a procedure, which may be the physical counterpart to a logical relationship represented in a data model. The physical metadata for the procedure may specify a name of the procedure, the procedure's arguments and the return datatype and the datatypes of the arguments, and may include source code and a compiled version thereof.

A database object may be defined by the database dictionary, but the metadata in the database dictionary itself may only partly specify the properties of the database object. Other physical schema properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Query Optimization and Execution Plans

Query optimization generates one or more different candidate execution plans for a query, which are evaluated by the query optimizer to determine which execution plan should be used to compute the query.

Execution plans may be represented by a graph of interlinked vertices, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e., one for which a potentially more efficient and less costly execution plan can be generated. Examples of query transformation include view merging, subquery unnesting, predicate move-around and push-down, common subexpression elimination, outer-to-inner join conversion, materialized view rewrite, and star transformation.

A database client, not depicted in FIG. 1, connects to a database system that comprises database server instance 120. The client may comprise a database application running on a client node. The client interacts with database server instance 120 by submitting commands that cause the instance to perform operations on data stored in the database. For example, a command may be a request to access or modify data from the database, perform operations on the data, and/or return the data to the client.

According to an embodiment, device 100 may be a single device implementing the database system, or may be part of a cluster of machines, known as vertices, each running a database server instance. A database server instance (or "instance") is a server that comprises a combination of the software and allocation of resources from a machine node. Specifically, a server, such as a database server, or any other process is a combination of integrated software components and an allocation of computational resources, such as memory, a node (i.e., a computing device and/or memory accessible to the computing device), and/or sub-processes on the node for executing the integrated software components on a processor, the combination of the software and computational resources being dedicated to performing a particular function on behalf of one or more clients. When the database system is a multi-node system, instances of the database system, such as database server instance 120, collectively implement server-side functions of the distributed database system.

Database 112 stores database data in any format, such as graph, RDF, relational, etc. Database 112 may reside in volatile and/or non-volatile storage, including persistent storage 110 or volatile memory of computing device 100. Each node implementing a multi-node database system may include a virtual disk and/or a set of physical disks. Additionally, or alternatively, database 112 may be stored, at least in part, in main memory of a database server computing device.

Database data may be stored in any type of computer-readable storage media, such as flash storage or non-volatile memory. In some embodiments, database 112 stores data for a distributed database that comprises a plurality of databases each stored in a respective one or more storage media. In other embodiments, machines implementing the database system have shared access to at least a portion of database data via shared access to storage storing database data.

One or more of the functions attributed to any process described herein, may be performed any other logical entity that may or may not be depicted in FIG. 1, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
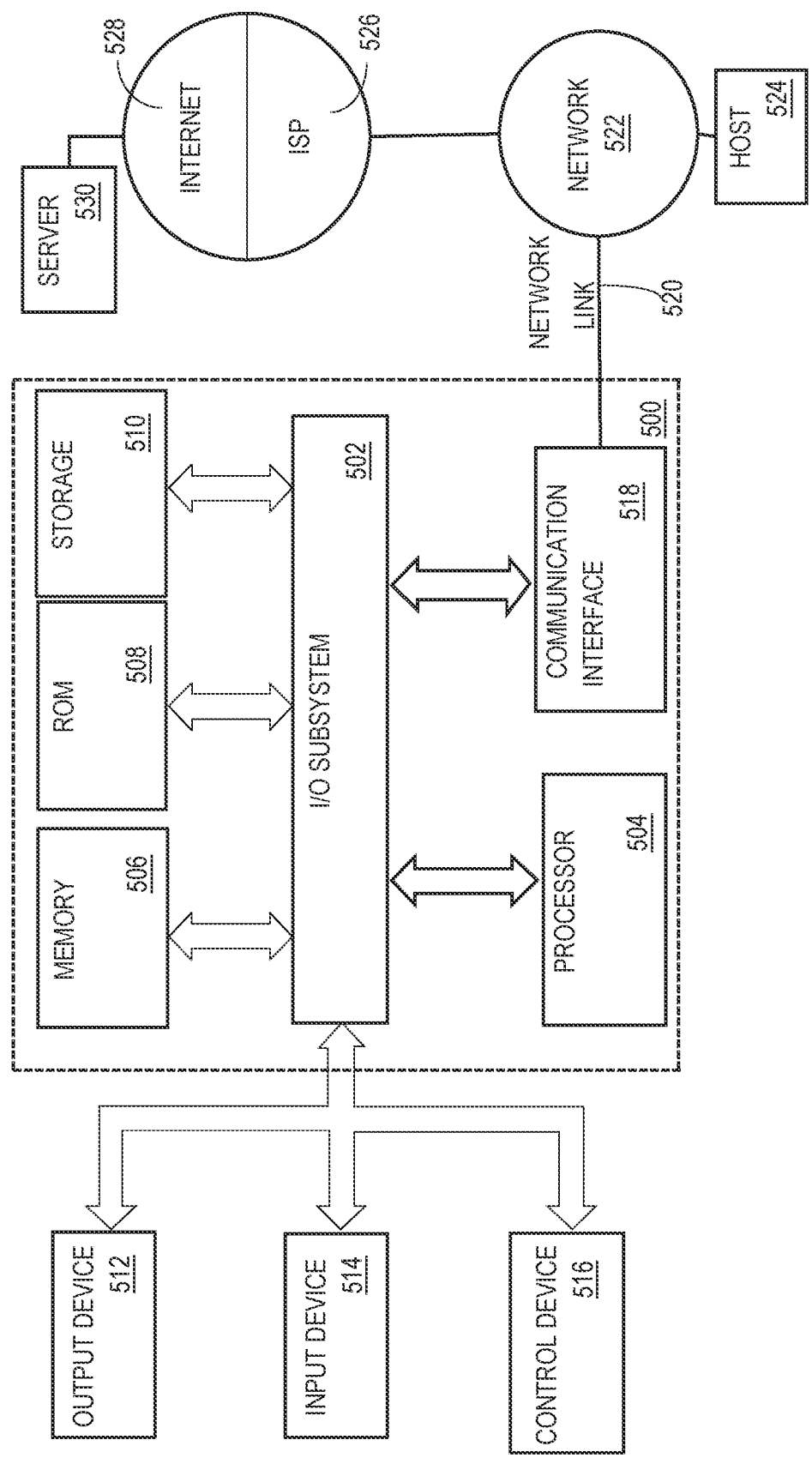
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
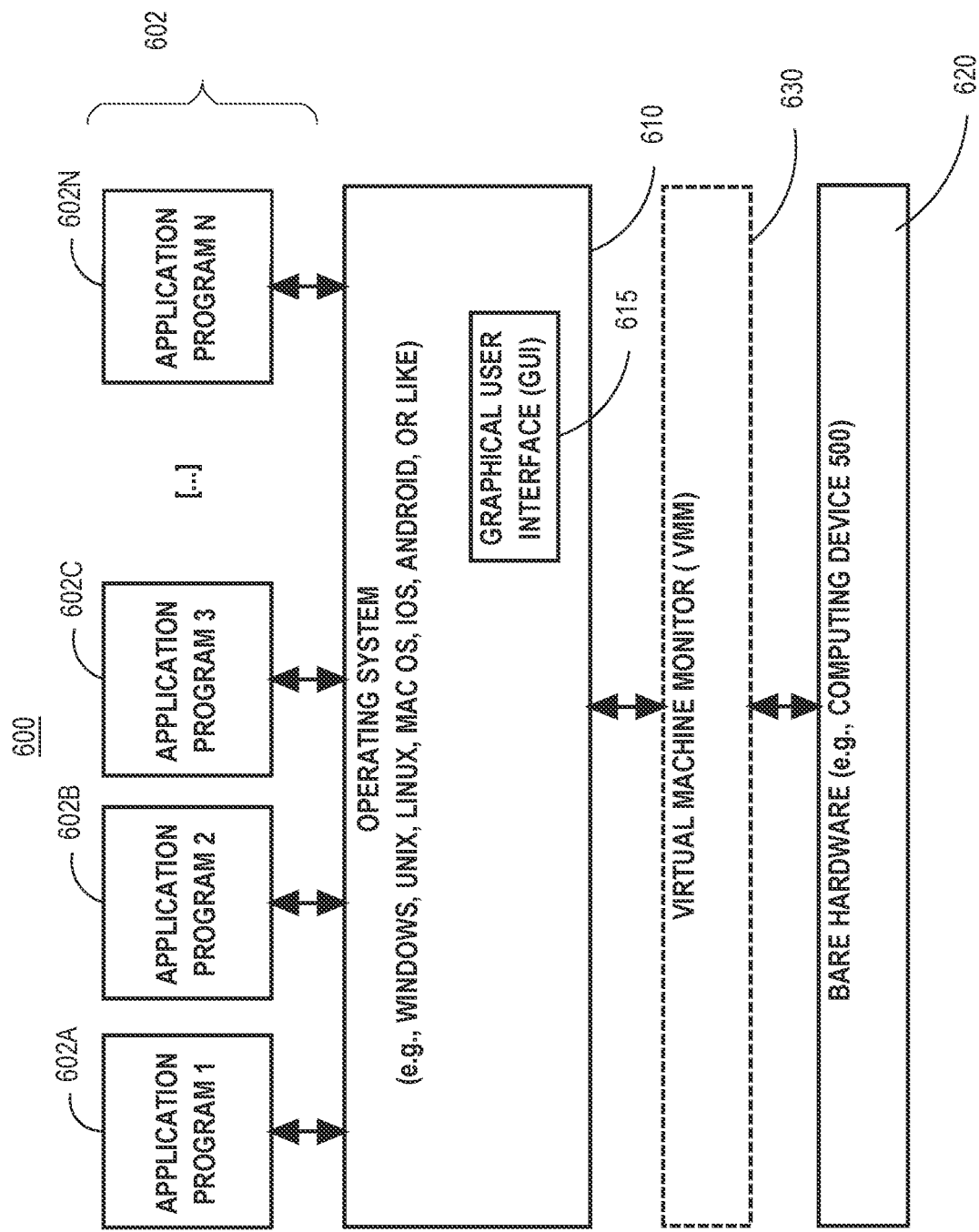
FIG. 6 is a block diagram of a basic software system that may be employed for controlling the operation of a computer system.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
    rewriting, by a database management system (DBMS), a particular query that:
        references a plurality of database objects,
        includes one or more aggregate expressions, and
        includes a particular join expression;
    wherein the plurality of database objects comprises two or more aggregate database objects that are referenced in the one or more aggregate expressions;
    wherein rewriting the particular query comprises:
        identifying one or more valid states for the particular query;
        wherein each valid state, of the one or more valid states, identifies:
            a coalesce set of database objects that comprises at least one aggregate database object of the two or more aggregate database objects, and
            a factor set of database objects that comprises one or more database objects, of the plurality of database objects, other than the coalesce set of database objects identified by said each valid state;
        selecting a particular valid state, of the one or more valid states, that comprises:
            a particular coalesce set of database objects that includes less than all of the two or more aggregate database objects, and
            a particular factor set of database objects; and
        generating a rewritten query that applies early grouping based on the selected particular valid state, before applying the particular join expression, for at least one of:
            the particular coalesce set of database objects, and
            the particular factor set of database objects; and
    executing, by the DBMS, the rewritten query;
    wherein the method is performed by one or more computing devices.

2. The computer-executed method of claim 1 wherein the rewritten query applies early grouping, before applying the particular join expression, for the particular coalesce set of database objects.

3. The computer-executed method of claim 1 wherein:
    a particular aggregate expression, of the one or more aggregate expressions, comprises:
        a particular aggregate function, and
        a particular arithmetic expression that refers to the two or more aggregate database objects;
    said generating the rewritten query comprises generating a view arithmetic expression and an outer arithmetic expression to implement the particular arithmetic expression, by:
        identifying one or more function-specific modification rules that are specific to the particular aggregate function, and
        applying the one or more function-specific modification rules to the particular arithmetic expression to produce the view arithmetic expression and the outer arithmetic expression;
    wherein the rewritten query includes:
        in a view, the view arithmetic expression, and
        outside of the view, the outer arithmetic expression.

4. The computer-executed method of claim 3 wherein said applying the one or more function-specific modification rules to the particular arithmetic expression comprises:
    normalizing the particular arithmetic expression to produce a normalized arithmetic expression combines two or more product terms using one or more of addition or subtraction;
    wherein the one or more function-specific modification rules are applied to the normalized arithmetic expression.

5. The computer-executed method of claim 4 wherein:
    each product term, of the two or more product terms, comprises one or more database object references; and
    a particular product term, of the two or more product terms, comprises two or more database object references that are combined using one or more of multiplication or division.

6. The computer-executed method of claim 4 wherein:
    the particular aggregate function is one of: (a) a SUM function, (b) a MIN function wherein values aggregated by the particular aggregate expression are non-negative, or (c) a MAX function, wherein values aggregated by the particular aggregate expression are non-negative; and
    said applying the one or more function-specific modification rules to the particular arithmetic expression further comprises, for each product term of the two or more product terms:

determining whether said each product term includes any database object of the particular coalesce set of database objects;
responsive to determining that said each product term does not include any database object of the particular coalesce set of database objects:
including, in the view arithmetic expression, a counter that counts a cardinality of the view, and
including, in the outer arithmetic expression, said each product term multiplied by the count of the cardinality from the view; and
responsive to determining that said each product term includes one or more coalesce database objects, of the particular coalesce set of database objects, comprising less than all of the particular coalesce set of database objects:
including, in the view arithmetic expression, a partial-term aggregate expression that calculates a sum of a first portion of said each product term that corresponds to the one or more coalesce database objects, and
including, in the outer arithmetic expression, a second portion of said each product term, corresponding to one or more other database objects of said each product term other than the one or more coalesce database objects, multiplied by a result of the partial-term aggregate expression from the view; and
responsive to determining that said each product term includes all database objects of the particular coalesce set of database objects:
including, in the view arithmetic expression, a whole-term aggregate expression that calculates the sum of said each product term, and
including, in the outer arithmetic expression, a reference to the whole-term aggregate expression from the view.

7. The computer-executed method of claim 4 wherein:
the particular aggregate function is one of: a MIN function, or a MAX function; and
said applying the one or more function-specific modification rules to the particular arithmetic expression further comprises, for each product term of the two or more product terms:
determining whether said each product term includes all database objects of the particular coalesce set of database objects;
responsive to determining that said each product term includes all database objects of the particular coalesce set of database objects:
including, in the view arithmetic expression, a whole-term aggregate expression with the particular aggregate function operating over said each product term, and
including, in the outer arithmetic expression, a reference to the whole-term aggregate expression from the view; and
responsive to determining that said each product term does not include all database objects of the particular coalesce set of database objects:
causing a grouping expression of the view to group by values from each database object, in said each product term, that is in the particular coalesce set of database objects, and
including, in the outer arithmetic expression, a rewritten product term corresponding to said each product term, wherein, in the rewritten product term, each reference to a database object that is in the particular coalesce set of database objects is replaced with a corresponding reference to the view.

8. The computer-executed method of claim 3 wherein:
the particular aggregate function is a COUNT function; and
said applying the one or more function-specific modification rules to the particular arithmetic expression comprises:
responsive to determining that the particular arithmetic expression refers to one or more coalesce database objects, of the particular coalesce set of database objects, including, in the view arithmetic expression, a coalesce simplified expression that includes a respective reference to each coalesce database object of the one or more coalesce database objects; and
responsive to determining that the particular arithmetic expression refers to one or more factor database objects, of the particular factor set of database objects, including, in the outer arithmetic expression, a factor simplified expression that includes a reference to each factor database object of the one or more factor database objects.

9. The computer-executed method of claim 8 wherein:
the particular arithmetic expression refers to two or more coalesce database objects; and
the coalesce simplified expression combines references to the two or more coalesce database objects via addition;
the particular arithmetic expression refers to two or more factor database objects; and
the factor simplified expression combines references to the two or more factor database objects via addition.

10. The computer-executed method of claim 8 further comprising including, in the outer arithmetic expression, an expression that returns 0 if a result of the factor simplified expression is NULL, and returns 1 if a result of the factor simplified expression is not NULL.

11. One or more non-transitory computer-readable media storing one or more sequences of instructions that, when executed by one or more processors, cause:
rewriting, by a database management system (DBMS), a particular query that:
references a plurality of database objects,
includes one or more aggregate expressions, and
includes a particular join expression;
wherein the plurality of database objects comprises two or more aggregate database objects that are referenced in the one or more aggregate expressions;
wherein rewriting the particular query comprises:
identifying one or more valid states for the particular query;
wherein each valid state, of the one or more valid states, identifies:
a coalesce set of database objects that comprises at least one aggregate database object of the two or more aggregate database objects, and
a factor set of database objects that comprises one or more database objects, of the plurality of database objects, other than the coalesce set of database objects identified by said each valid state;
selecting a particular valid state, of the one or more valid states, that comprises:
a particular coalesce set of database objects that includes less than all of the two or more aggregate database objects, and a particular factor set of database objects; and
generating a rewritten query that applies early grouping based on the selected particular valid state, before applying the particular join expression, for at least one of:
the particular coalesce set of database objects, and
the particular factor set of database objects; and
executing, by the DBMS, the rewritten query.

12. The one or more non-transitory computer-readable media of claim 11 wherein the rewritten query applies early grouping, before applying the particular join expression, for the particular coalesce set of database objects.

13. The one or more non-transitory computer-readable media of claim 11 wherein:
a particular aggregate expression, of the one or more aggregate expressions, comprises:
a particular aggregate function, and
a particular arithmetic expression that refers to the two or more aggregate database objects;
said generating the rewritten query comprises generating a view arithmetic expression and an outer arithmetic expression to implement the particular arithmetic expression, by:
identifying one or more function-specific modification rules that are specific to the particular aggregate function, and
applying the one or more function-specific modification rules to the particular arithmetic expression to produce the view arithmetic expression and the outer arithmetic expression;
wherein the rewritten query includes:
in a view, the view arithmetic expression, and
outside of the view, the outer arithmetic expression.

14. The one or more non-transitory computer-readable media of claim 13 wherein said applying the one or more function-specific modification rules to the particular arithmetic expression comprises:
normalizing the particular arithmetic expression to produce a normalized arithmetic expression combines two or more product terms using one or more of addition or subtraction;
wherein the one or more function-specific modification rules are applied to the normalized arithmetic expression.

15. The one or more non-transitory computer-readable media of claim 14 wherein:
each product term, of the two or more product terms, comprises one or more database object references; and
a particular product term, of the two or more product terms, comprises two or more database object references that are combined using one or more of multiplication or division.

16. The one or more non-transitory computer-readable media of claim 14 wherein:
the particular aggregate function is one of: (a) a SUM function, (b) a MIN function wherein values aggregated by the particular aggregate expression are non-negative, or (c) a MAX function, wherein values aggregated by the particular aggregate expression are non-negative; and
said applying the one or more function-specific modification rules to the particular arithmetic expression further comprises, for each product term of the two or more product terms:
determining whether said each product term includes any database object of the particular coalesce set of database objects;
responsive to determining that said each product term does not include any database object of the particular coalesce set of database objects:
including, in the view arithmetic expression, a counter that counts a cardinality of the view, and
including, in the outer arithmetic expression, said each product term multiplied by the count of the cardinality from the view; and
responsive to determining that said each product term includes one or more coalesce database objects, of the particular coalesce set of database objects, comprising less than all of the particular coalesce set of database objects:
including, in the view arithmetic expression, a partial-term aggregate expression that calculates a sum of a first portion of said each product term that corresponds to the one or more coalesce database objects, and
including, in the outer arithmetic expression, a second portion of said each product term, corresponding to one or more other database objects of said each product term other than the one or more coalesce database objects, multiplied by a result of the partial-term aggregate expression from the view; and
responsive to determining that said each product term includes all database objects of the particular coalesce set of database objects:
including, in the view arithmetic expression, a whole-term aggregate expression that calculates the sum of said each product term, and
including, in the outer arithmetic expression, a reference to the whole-term aggregate expression from the view.

17. The one or more non-transitory computer-readable media of claim 14 wherein:
the particular aggregate function is one of: a MIN function, or a MAX function; and
said applying the one or more function-specific modification rules to the particular arithmetic expression further comprises, for each product term of the two or more product terms:
determining whether said each product term includes all database objects of the particular coalesce set of database objects;
responsive to determining that said each product term includes all database objects of the particular coalesce set of database objects:
including, in the view arithmetic expression, a whole-term aggregate expression with the particular aggregate function operating over said each product term, and
including, in the outer arithmetic expression, a reference to the whole-term aggregate expression from the view; and
responsive to determining that said each product term does not include all database objects of the particular coalesce set of database objects:
causing a grouping expression of the view to group by values from each database object, in said each product term, that is in the particular coalesce set of database objects, and
including, in the outer arithmetic expression, a rewritten product term corresponding to said each product term, wherein, in the rewritten product term, each reference to a database object that is in the particular coalesce set of database objects is replaced with a corresponding reference to the view.

18. The one or more non-transitory computer-readable media of claim 13 wherein:
the particular aggregate function is a COUNT function; and
said applying the one or more function-specific modification rules to the particular arithmetic expression comprises:
responsive to determining that the particular arithmetic expression refers to one or more coalesce database objects, of the particular coalesce set of database objects, including, in the view arithmetic expression, a coalesce simplified expression that includes a respective reference to each coalesce database object of the one or more coalesce database objects; and
responsive to determining that the particular arithmetic expression refers to one or more factor database objects, of the particular factor set of database objects, including, in the outer arithmetic expression, a factor simplified expression that includes a reference to each factor database object of the one or more factor database objects.

19. The one or more non-transitory computer-readable media of claim 18 wherein:
the particular arithmetic expression refers to two or more coalesce database objects; and
the coalesce simplified expression combines references to the two or more coalesce database objects via addition;
the particular arithmetic expression refers to two or more factor database objects; and
the factor simplified expression combines references to the two or more factor database objects via addition.

20. The one or more non-transitory computer-readable media of claim 18 wherein the one or more sequences of instructions further comprise instructions that, when executed by one or more processors, cause including, in the outer arithmetic expression, an expression that returns 0 if a result of the factor simplified expression is NULL, and returns 1 if a result of the factor simplified expression is not NULL.

* * * * *

UNITED STATES PATENT AND TRADEMARK OFFICE
CERTIFICATE OF CORRECTION

| | |
|---|---|
| PATENT NO. | : 11,416,489 B2 |
| APPLICATION NO. | : 17/105255 |
| DATED | : August 16, 2022 |
| INVENTOR(S) | : Pasupuleti |

Page 1 of 1

It is certified that error appears in the above-identified patent and that said Letters Patent is hereby corrected as shown below:

In the Specification

In Column 10, Line 18, delete "T4.z))" and insert -- T4.z))) --, therefor.

In Column 10, Line 26, delete "T4.z))" and insert -- T4.z))) --, therefor.

In Column 10, Line 27, delete "T4.z))" and insert -- T4.z))) --, therefor.

In Column 12, Line 18, delete "((C)⊂AT);" and insert -- ({C}⊂AT); --, therefor.

In Column 18, Line 38, delete "that that" and insert -- that --, therefor.

In Column 20, Line 18, delete "Ti," and insert -- T1, --, therefor.

Signed and Sealed this
Fourteenth Day of February, 2023

*Katherine Kelly Vidal*

Katherine Kelly Vidal
*Director of the United States Patent and Trademark Office*